United States Patent Office 2,720,495
Patented Oct. 11, 1955

2,720,495

RUBBER-FILLER-SILICONE COMPOUNDS AND THEIR MANUFACTURE

Ellis H. Phreaner, Los Angeles, Calif., assignor of one-third to H. Calvin White, Pasadena, Calif.

No Drawing. Application September 25, 1947, Serial No. 776,159

10 Claims. (Cl. 260—29.1)

This invention has to do with new rubber compositions and processes for their manufacture, and has for its general purpose to impart to vulcanized natural and synthetic rubbers, improved properties of the character hereinafter explained. Particularly the invention aims to improve any of various rubbers by incorporating in them organo-oxygen-silicon polymers known as "silicones." This application is a continuation-in-part of my copending application Ser. No. 721,481, filed January 10, 1947 (now abandoned), on "Rubber Silicone Compound and Compounding Process."

The silicones are polymerized organo-silicon materials built on a skeleton of Si-O-Si structures with any of a wide variety of organic groups fastened to the silicon atoms through a C-Si linkage. Generally speaking, the invention contemplates the use of any type of thermally stable liquid silicone composition capable of improving plasticity of the unvulcanized rubber and imparting to the vulcanized rubber the resistant qualities to which I later refer. Such classes of silicones may includes the polymerized open chain silicones, or polymerized cyclic silicones, or mixtures thereof.

Particularly good results have been acomplished with thermally stable liquid silicone polymers preponderately of the open chain dimethylsiloxanes with trimethylsiloxy end groups and having the general formula:

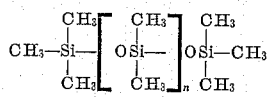

where "$n$" may be any number from one to a very large number. A range of polymer lengths from "$n$"=4, having an approximate molecular weight of 310.44, up to high polymers having approximate molecular weight of 26,400 (e. g. in the Dow-Corning "D-C" silicone fluid types "500" and "200," having viscosities from 1.5 to 1000 centistokes at 25° C.) have been used. It appears that a mixture of chain lengths is desirable, favoring cross linkage and condensation of the silicone polymer chains in the compounded rubber composition, to give a rubber-silicone composition maximum oil resistance.

It is understood that some groups in the silicone compounds contemplated for the purposes of the invention, may have hydroxyl terminations, at least during intermediate stages in the silicone polymerization. This temporary end grouping of course favors the reactivity of the compounds. Present in the higher polymers, either originally or as a result of chain condensation, may be unblocked polymer chains which aid the process of chain linking in the compounded rubber.

As illustrative of the cyclic silicone polymers, I may use cyclic dimethylsiloxane polymers of the general formula [(CH₃)₂SiO]$x$, where "$x$" may be a number ranging, for example, from 3 to 8, inclusive. These can be prepared by the depolymerization and subsequent regrouping of dimethylsiloxane high polymers under conditions of heat, alkalinity or catalysis, as by iron oxide or other metal oxides, according to the conditions existing in compounding of the rubber formulas herein disclosed, so that the presence of these cyclic forms may be contemplated. The cyclic dimethylsiloxane polymers are reactive by nature, and consequently aid in the cross linking processes.

It is further observed that other alkyl or aryl radicals may be substituted for the methyl groups for such purposes as to have a modifying effect on the physical characteristics of the polymerization product, and particularly for the purposes of the invention, to afford better dispersion qualities in compounding of the rubber formulae, and corresponding improvement of the finished product.

From the foregoing it will be understood that as herein used, the term "silicone" or "silicone polymer," includes polymerized organo-silicon compounds having a Si-O-Si skeleton structure with organic groups attached to the silicon atoms through C-Si linkages, such compounds being of open chain formation (with or without closed side or end chains) or of cyclic structure, with or without methyl group substitution as by multiple carbon alkyl or aryl radicals. Being of open chain or cyclic formation, such compounds do not undergo intermolecular polymerization and hence retain their liquid form and stability despite heating.

The invention contemplates generally the improvement of both natural and synthetic rubber compositions, although its advantages are rather distinctively pronounced as applied to synthetic rubbers of the following types: butadiene-styrene, butadiene-acrylonitrile, chloroprene, chloroprene-isoprene, and chloroprene-acrylonitrile polymers and copolymers. The natural and synthetic rubbers which may be benefited by incorporation therewith of a siloxane fluid in accordance with the invention, may be characterized as an elastomeric polymer of a conjugated diolefinic compound containing a straight chain of at most four carbon atoms. Incorporation of the silicones in these rubbers, particularly by the methods hereinafter explained, have been found to produce a number of important advantages and improved properties.

As an example, a compound of a chloroprene polymer (neoprene G. R. M.–10) with a silicate filler, for example calcium silicate, together with a silicone additive, e. g. Dow-Corning "D-C" fluid series 200—200 centistokes, and iron oxide, zinc oxide and calcined magnesium oxide, showed very little swell (10% volume increase), and displayed resistance to rupture under stress (the test piece was maintained at a constant elongation of 175%) when immersed in diesel oil held at 200° F. for several weeks. The same formula without the addition of the silicones showed 24% volume increase after one week by the same oil test, and ruptured at the same stress within a few hours. Superior oil resistance as well as abrasion resistance of the silicone rubber composition, has been confirmed by months of service in oil well drilling operations, where drill pipe protectors of such compositions have been operating without deterioration in oil base mud containing aromatic oils, at high temperatures and pressures, under which conditions similar rubbers, lacking the silicones, have invariably failed.

Plasticity in milling, extruding and molding of the rubber is improved by the silicone additions. The benefits of improved plasticity are of particular advantage in the compounding of chloroprene polymers and acrylonitrile-butadiene co-polymers for heat and oil resistance. In addition to improving the plasticity of the elastomers, the silicones minimize any losses from the vulcanized product by oil extraction or high temperature volatilization.

By using the lower viscosity silicone fluids (e. g. Dow-Corning "D-C 500 series"—50 centistokes, for 50% of the silicone additive, and "D-C 200 series"—200 centistokes, for the remaining 50%) in portions ranging between one-half to ten parts (by weight) of total silicones to one hundred parts of rubbery, very satisfactory milling and molding plasticity was obtained. Where plasticity may not be of essential importance, a lesser proportion of silicone may be used to favor other desired properties in the rubber. This same ratio range applies generally to the incorporation of whatever particular silicone additive selected, in any of the named rubbers.

The improved physical qualities (particularly increased heat, oil and abrasion resistance, and better electrical insulating qualities) resulting from the silicone additive are no doubt due in large degree to two factors: (1) the condensation and cross linking between silicone polymers, and (2) better dispersion and bonding of mineral pigments as a result of surface tension and electric potential bonding forces between the rubber molecule, silicone and pigment.

The condensation and cross linking of the silicone polymers is activated and catalysed by the presence of catalysts such as calcined magnesia, iron oxide, or other compounds known to catalyse silicone polymerization. In chloroprene polymers the chlorine from the rubber molecule also catalyses this polymer cross linkage and chain condensation. The condensation product is in itself ultimately insoluble in toluene, and in the rubber composition the quality of oil resistance (both as to volume increase and rupture under stress) exceeds anything heretofore attainable with the chloroprene rubber compositions. Acrylonitrile-butadiene co-polymers, although by nature more oil resistant than the chloroprene rubber compositions, are likewise greatly benefited by the silicone additive. The effect on electric potential bonding forces between the rubber molecule and mineral pigment of the silicone bridge between the organic rubber and the mineral filler is also of great importance in improving oil and water resistance, and electrical insulating quality particularly in under-water insulation.

The method of incorporating the silicones in the rubber compound is of importance from the standpoint of ease of incorporation and degree of dispersion. While it has been assumed that these organo-metallic silicones are incompatible with rubber hydrocarbons, I have found that when properly prepared and dispersed in a silicate filler, they actually become readily compatible, and capable of forming with the rubber hydrocarbons a uniformly homogeneous composition. Of particular significance is the property of the silicone filler to act as a surface dispersing or bonding agent.

According to one method, I first effect a dispersion of the silicone in a filler, preferably one having a particular or bond affinity for the silicone. Such affinity is found to exist between the silicones and inorganic silicates, generally the alkali earth metal silicates, and preferably calcium silicate. For example, the silicone may be mixed with calcium silicate by ball milling or other suitable method of mixing, to effect an intimate and uniform dispersion by reason of the affinity of the silicone for the silicate. The percentage of silicone to silicate may range between about 0.1% to 25% depending upon such considerations as the amount of filler to be put into the rubber, which of course may vary widely, and the amount of silicone to be added in any given instance. This dispersion is then readily incorporated with the elastomer by intermixing in the usual rubber mills.

Another and preferred method of adding the silicones to the elastomer is to prepare a water slurry of the silicate and silicones, which is added to the rubber latex, followed by coagulation of the rubber with resultant absorption of the silicone-silicate by the rubber molecule. To accomplish this a water emulsion of silicones is prepared as in the following typical manner: 3 parts (by weight) of oleic acid are stirred into 44 parts of the silicone. In a separate container 17 parts of morpholine are added to 36 parts of water. The two solutions are then mixed together with vigorous stirring. From 4 to 100 parts of calcium silicate for each part of silicone is added to the slurry and the resulting mixture ball milled or dispersed by any other suitable method. The slurry is then further diluted by water and added to the rubber latex. The latex is then coagulated with a coagulating agent as by the addition of dilute acid, causing the adsorption of the silicone-silicate in intimate dispersion by the rubber molecule. Among its applications, this method has been successfully used with chloroprene polymers, acrylonitrile-butadiene, and butadiene-styrene co-polymers. It is also possible to effect adsorption by coagulation by adding the silicone emulsion direct to the latex without slurrying with a silicate.

The above-mentioned slurry dispersion method is more particularly dealt with in my application Serial No. 413,470, filed March 1, 1954, on "Silicone Supplemented Fillers and Rubbers, and Methods for Their Manufacture."

The following are typical formulas for vulcanized natural and synthetic rubber-silicone compositions of high heat, oil, water and abrasion resistant qualities:

*Chloroprene polymer*

| | Parts by weight |
|---|---|
| Chloroprene polymer | 100.00 |
| Dow-Corning D-C silicone fluid 200 series, 200 cstks | 1.50 |
| Calcium silicate | 62.85 |
| Stearic acid | .55 |
| Polymerized trimethyldihydroquinoline | 2.00 |
| Extra light calcined magnesia | 4.05 |
| Zinc oxide | 10.00 |
| Iron oxide | 5.00 |

*Butadiene-acrylonitrile co-polymer*

| | |
|---|---|
| Butadiene-acrylonitrile copolymer | 100.00 |
| Dow-Corning D-C silicone fluid: | |
| Series 500, 50 cstks | 1.25 |
| Series 200, 200 cstks | 1.25 |
| Calcium silicate | 20.00 |
| Calcium carbonate | 64.00 |
| Stearic acid | 1.25 |
| Polymerized trimethyldihydroquinoline | 2.00 |
| Extra light calcined magnesia | 1.00 |
| Zinc oxide | 5.00 |
| Iron oxide | 5.00 |
| Benzothiazyl disulfide | 3.00 |
| Tetramethyl thiuram disulfide | 3.00 |

*Butadiene-styrene co-polymer*

| | |
|---|---|
| Butadiene-styrene copolymer | 100.00 |
| Dow-Corning silicone fluid D-C 200 series, 350 cstks | 1.00 |
| Calcium silicate | 10.00 |
| Channel black | 50.00 |
| Stearic acid | 1.50 |
| Extra light calcined magnesia | 1.00 |
| Zinc oxide | 5.00 |
| Iron oxide | 5.00 |
| Benzothiazyl disulfide | 1.00 |
| Selenium diethyl dithiocarbamate | 2.00 |

*Natural rubber*

| | |
|---|---|
| Natural rubber (smoke sheet) | 100.00 |
| Silicones, fluid, Dow-Corning D-C: | |
| Series 500, 50 cstks | .25 |
| Series 200, 200 cstks | .25 |
| Calcium silicate | 10.00 |
| Channel black | 50.00 |
| Stearic acid | 1.50 |
| Polymerized trimethyldihydroquinoline | 2.00 |
| Extra light calcined magnesia | 1.00 |
| Zinc oxide | 5.00 |
| Iron oxide | 5.00 |
| Tetramethyl thiuram disulfide | 3.00 |
| Tellurium | .50 |

I claim:

1. The composition comprising a vulcanized rubber of the class consisting of natural rubber and butadiene-styrene, butadiene-acrylonitrile, chloroprene-isoprene, chloroprene-acrylonitrile, copolymers, and polychloroprene, containing a uniform dispersion of a completely polymerized thermally stable liquid polymer of a dihydrocarbon substituted siloxane in which the substituent groups are of the class consisting of alkyl and aryl groups, said composition containing in excess of one-half part by weight of the liquid polymer for one hundred parts of the vulcanized rubber, and said composition containing a filler having a silicate radical bonded to the siloxane polymer.

2. The product resulting from vulcanizing a coagulum of a uniform mixture of a latex of a rubbery polymer of the class consisting of natural rubber and butadiene-styrene, butadiene-acrylonitrile, chloroprene-isoprene and chloroprene-acrylonitrile copolymers and polychloroprene with a thermally stable liquid dimethylsiloxane polymer and a filler having a silicate radical bonded to the siloxane polymer, the vulcanized product containing in excess of one-half part by weight of the liquid polymer for one hundred parts of the vulcanized rubbery polymer.

3. The method that includes dispersing a thermally stable liquid dimethylsiloxane polymer on particles of a filler having a silicate radical bondable to the polymer, forming a uniform mixture of the polymer and filler with a latex of a rubbery polymer of the class consisting of natural rubber and butadiene-styrene, butadiene-acrylonitrile, chloroprene-isoprene and chloroprene-acrylonitrile copolymers and polychloroprene, separating the solids of the resulting mixture from the aqueous phase and vulcanizing the resulting product, the vulcanized product containing in excess of one-half part by weight of the liquid siloxane polymer for one hundred parts of the vulcanized rubber.

4. A method which comprises uniformly mixing a completely polymerized thermally stable liquid polymeric dihydrocarbon substituted siloxane in which the substituent groups are of the class consisting of alkyl and aryl groups, with filler, the percentage of polymeric siloxane being at least 0.1% based on the amount of filler, thereafter incorporating the polymeric siloxane-filler mixture into an elastomer of the class consisting of natural rubber and butadiene-styrene, butadiene-acrylonitrile, chloroprene-isoprene, chloroprene-acrylonitrile copolymers, and polychloroprene, the amount of polymeric siloxane being at least one and one-half parts by weight for one hundred parts of the elastomer to produce a uniform dispersion of the polymeric siloxane and the filler in the elastomer.

5. The product prepared by the method of claim 4.

6. The method as defined in claim 4 in which the filler has a silicate radical.

7. The product prepared by the method of claim 6.

8. A method which comprises uniformly milling a completely polymerized thermally stable liquid polymeric dihydrocarbon substituted siloxane in which the substituent groups are of the class consisting of alkyl and aryl groups, with filler, the percentage of polymeric siloxane being at least about 1.8% based on the amount of filler thereafter milling the polymeric siloxane-filler mixture with an elastomer of the class consisting of natural rubber and butadiene-styrene, butadiene-acrylonitrile copolymers, and polychloroprene, the amount of polymeric siloxane being at least one and one-half parts by weight for 100 parts of the elastomer to produce a uniform dispersion of the polymeric siloxane and the filler in the elastomer.

9. A method which comprises forming a mixture consisting essentially of a preformed completely polymerized thermally stable liquid polymeric dihydrocarbon substituted siloxane in which the substituent groups are of the class consisting of alkyl and aryl groups, with filler, the percentage of polymeric siloxane being at least about 1.8% based on the amount of filler, thereafter mechanically working the said polymeric siloxane-filler mixture into a plastic batch comprising an elastomer of the class consisting of natural rubber and butadiene-styrene, butadiene-acrylonitrile copolymers, and polychloroprene, the amount of polymeric siloxane being at least one and one-half parts by weight for 100 parts of the elastomer to produce a dispersion of the polymeric siloxane and the filler throughout the elastomer.

10. A method which comprises uniformly mixing a completely polymerized, thermally stable polymeric dihydrocarbon substituted siloxane fluid in which the substituent groups are of the class consisting of alkyl and aryl groups, with filler, the percentage of polymeric siloxane being at least about 1.8% based on the amount of filler, thereafter milling the polymeric siloxane-filler mixture with an elastomeric polymer of a conjugated diolefinic compound containing a straight chain of at most four carbon atoms, the amount of polymeric siloxane being at least one and one-half parts by weight for 100 parts of the elastomeric polymer to produce a uniform dispersion of the polymeric siloxane and the filler in the elastomeric polymer.

References Cited in the file of this patent

UNITED STATES PATENTS

| | | |
|---|---|---|
| 2,258,218 | Rochow | Oct. 7, 1941 |
| 2,375,007 | Larsen et al. | May 1, 1945 |
| 2,429,439 | Westfahl et al. | Oct. 21, 1947 |
| 2,470,772 | Haas | May 24, 1949 |
| 2,471,224 | Loughborough | May 24, 1949 |
| 2,472,495 | Sparks et al. | June 7, 1949 |
| 2,482,307 | Walker et al. | Sept. 20, 1949 |
| 2,610,167 | Te Grotenhuis | Sept. 4, 1952 |
| 2,615,006 | Lane | Oct. 21, 1952 |

OTHER REFERENCES

Pages 133 to 135, India Rubber World, vol. 6, No. 2, May 1942.

Chemical and Metallurgical Engineering, August 1944, pages 135 and 136.